(12) United States Patent
Maheshwari et al.

(10) Patent No.: US 11,218,887 B2
(45) Date of Patent: Jan. 4, 2022

(54) SWITCHING OF NETWORKS FOR A MOBILE DEVICE USING LOCATION BASED PREDICTIVE ALGORITHM

(71) Applicant: Cisco Technology, Inc., San Jose, CA (US)

(72) Inventors: Nitin Maheshwari, Bangalore (IN); Manoj Kumar Kushwaha, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/653,122

(22) Filed: Oct. 15, 2019

(65) Prior Publication Data

US 2021/0112423 A1 Apr. 15, 2021

(51) Int. Cl.
| | |
|---|---|
| *H04W 16/22* | (2009.01) |
| *H04W 16/18* | (2009.01) |
| *H04W 4/029* | (2018.01) |
| *H04W 36/00* | (2009.01) |
| *H04W 28/02* | (2009.01) |
| *H04W 64/00* | (2009.01) |
| *H04W 8/08* | (2009.01) |

(52) U.S. Cl.
CPC ......... *H04W 16/22* (2013.01); *H04W 4/029* (2018.02); *H04W 8/08* (2013.01); *H04W 16/18* (2013.01); *H04W 28/0268* (2013.01); *H04W 36/0061* (2013.01); *H04W 64/006* (2013.01)

(58) Field of Classification Search
CPC ..... H04W 16/22; H04W 16/18; H04W 4/029; H04W 36/0061; H04W 28/0268; H04W 8/08
See application file for complete search history.

(56) References Cited

U.S. PATENT DOCUMENTS

| | | |
|---|---|---|
| 9,451,098 B2 | 9/2016 | Zhu et al. |
| 10,200,837 B1 | 2/2019 | Steck |

(Continued)

OTHER PUBLICATIONS

Thales, "4 ways to activate eSIM-capable consumer IoT devices (2019)", https://www.gemalto.com/mobile/networks/on-demand-connectivity/consumer-esim-device-activation-modes, Sep. 24, 2019, 8 pages.

(Continued)

*Primary Examiner* — Christine Ng
(74) *Attorney, Agent, or Firm* — Edell, Shapiro & Finnan, LLC

(57) ABSTRACT

Methods are provided for switching networks for a mobile device using location based predictive algorithm. In these methods, a controller obtains a first network coverage map of a first network and a second network coverage map of a second network. The first network and the second network are configured to provide network connectivity to a mobile device. The method further includes the controller tracking the mobile device along a path over which the mobile device travels while the mobile device is connected to the first network, determining that a predicted future location along the path of the mobile device is not serviced by the first network and is serviced by the second network, and causing the mobile device to switch from the first network to the second network based on the mobile device reaching the predicted future location.

20 Claims, 13 Drawing Sheets

(56) References Cited

U.S. PATENT DOCUMENTS

| | | | | |
|---|---|---|---|---|
| 2013/0308470 A1* | 11/2013 | Bevan | ............... | H04W 36/32 |
| | | | | 370/252 |
| 2017/0013406 A1* | 1/2017 | Oliver | ............... | H04L 65/608 |
| 2017/0041864 A1* | 2/2017 | Kaliner | ............. | H04W 8/205 |
| 2017/0289788 A1* | 10/2017 | Lalwaney | ......... | H04L 41/0803 |
| 2018/0348333 A1* | 12/2018 | Bhatti | ............... | G01S 5/0263 |
| 2019/0110154 A1* | 4/2019 | Jantzi | ................. | H04L 67/34 |
| 2020/0151885 A1* | 5/2020 | Yang | ................. | G01S 19/393 |

OTHER PUBLICATIONS

GSM Association, "Embedded SIM Remote Provisioning Architecture", Version 1.1, Official Document 12FAST.13—Embedded SIM Remote Provisioning Architecture, https://www.gsma.com/iot/wp-content/uploads/2014/01/1.-GSMA-Embedded-SIM-Remote-Provisioning-Architecture-Version-1.1.pdf, Dec. 17, 2013, 84 pages.

Soh, Wee-Seng et al., "QoS provisioning in cellular networks based on mobility prediction techniques", https://www.ece.nus.edu.sg/stfpage/elesohws/CommMag_manuscript.pdf, downloaded Oct. 15, 2019, 10 pages.

Balasubramanian, Dushyanth, "QoS in Cellular Networks", Apr. 20, 2006, https://www.cse.wustl.edu/~jain/cse574-06/ftp/cellular_qos/index.html, 19 pages.

García, A. J. et al., "A Geometric Method for Estimating the Nominal Cell Range in Cellular Networks", Mobile Information Systems Volume 2018, Article ID 3479246, https://www.hindawi.com/journals/misy/2018/3479246/, May 2, 2018, 9 pages.

* cited by examiner

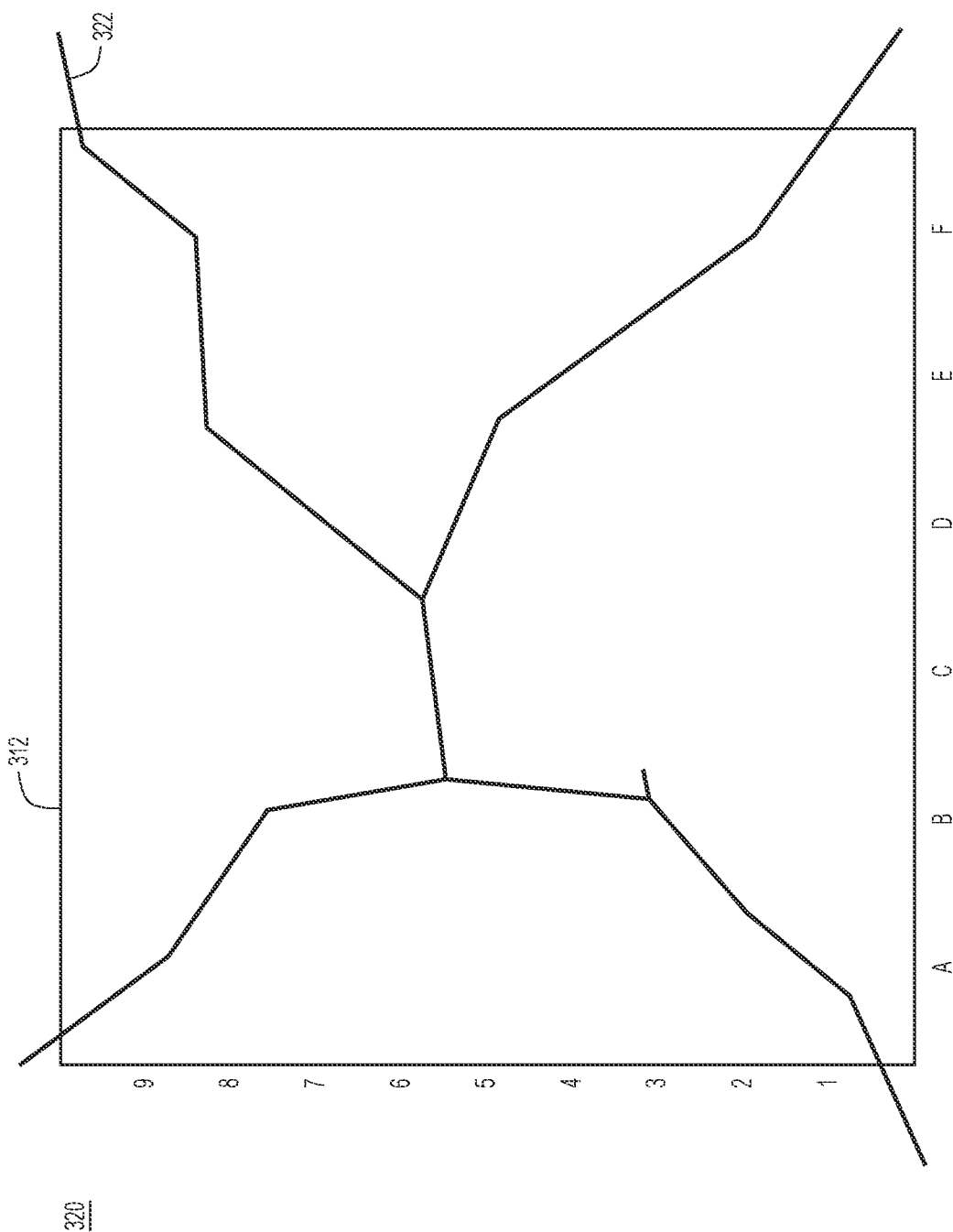

SWITCHING OF NETWORKS FOR A MOBILE DEVICE USING LOCATION BASED PREDICTIVE ALGORITHM

TECHNICAL FIELD

The present disclosure relates to networking, and more particularly to switching networks by mobile devices.

BACKGROUND

Mobile devices (or mobile stations (MSs)) include mobile terminals and mobile internet of things (IoT) devices such as cars, sensors, emergency vehicles, and first response devices. As these mobile devices move from one location to another, access to a given network may be lost. That is, coverage provided by various mobile network operators (MNOs) may vary from one another and from one geographic area to another geographic area. Not all MNOs across a given area have cellular towers or base stations (BSs) with the same signal strength everywhere. Indeed, the coverage areas of a given MNO might include dead zones. A dead zone is a geographical location in which a BS received signal is weak or is not present at all. In other words, a dead zone is an area not serviced by a network of an MNO.

It is not uncommon for different MNOs to have at least partially overlapping network coverage. In this regard, one MNO may provide better network coverage than another MNO at a given location and/or at a given point in time.

BRIEF DESCRIPTION OF THE DRAWINGS

FIGS. 3A-3I are views illustrating a method of proactively predicting when to switch the network to which a mobile device is connected based on predicting a future location of the mobile device and coverage provided by various networks, according to an example embodiment.

DESCRIPTION OF EXAMPLE EMBODIMENTS

Overview

Figure 1:
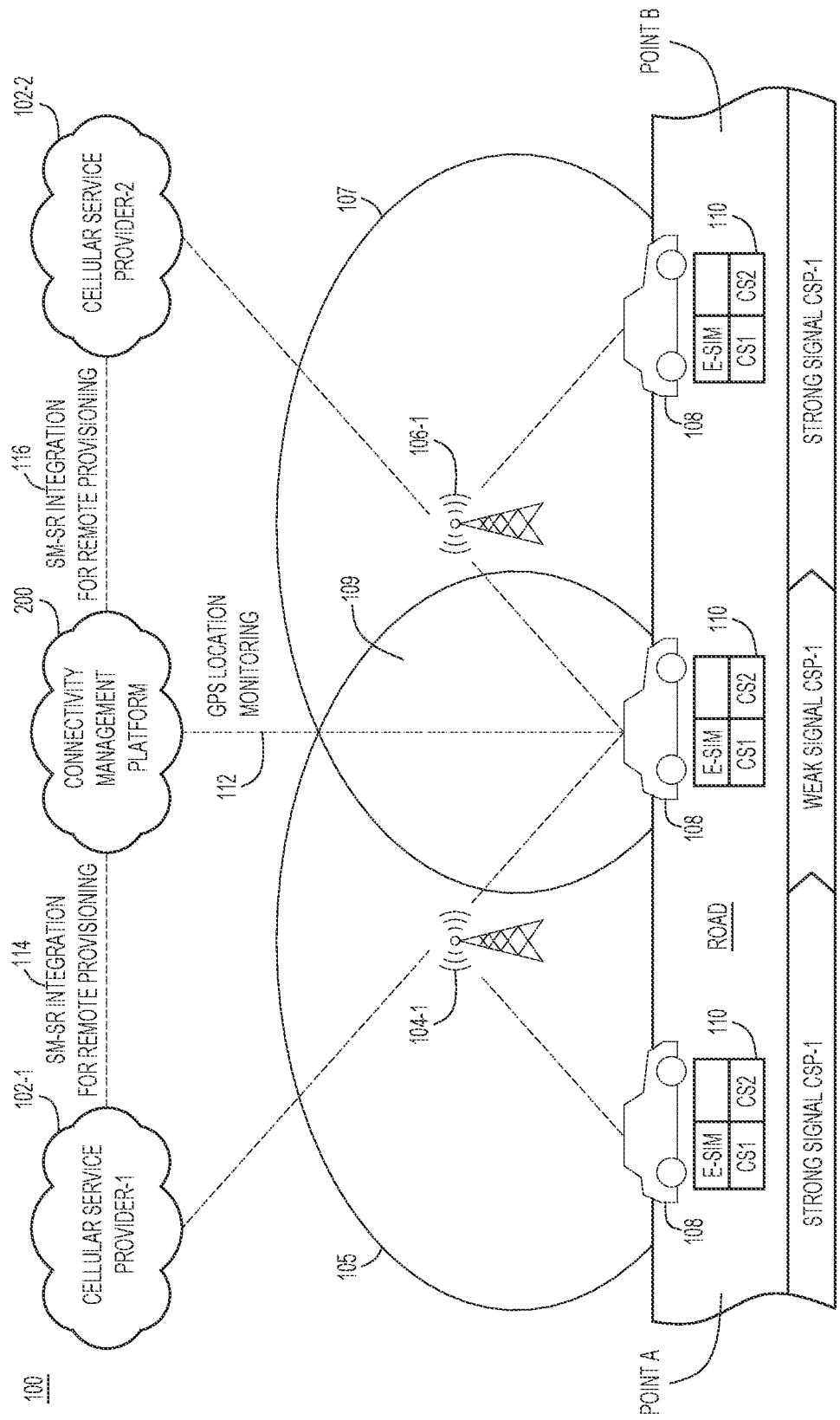
FIG. 1 is a view illustrating an environment in which network connectivity switching for a mobile device is performed, according to an example embodiment.

Briefly, methods, apparatuses, and computer readable medium to switch networks for a mobile device based on predicting a future location of the mobile device and network coverages are provided. One method includes obtaining, by a controller, a first network coverage map of a first network and a second network coverage map of a second network. The first network and the second network are configured to provide network connectivity to a mobile device. The method further includes the controller tracking the mobile device along a path over which the mobile device travels while the mobile device is connected to the first network, determining that a predicted future location along the path of the mobile device is not serviced by the first network and is serviced by the second network, and causing the mobile device to switch from the first network to the second network based on the mobile device reaching the predicted future location.

Example Embodiments

Mobile devices may require enhanced service assurance even when they are moving. Providing constant and/or reliable cellular network coverage and/or data services to moving devices is challenging due to various network limitations. To obtain enhanced service assurance while moving, a mobile device may need to switch networks. In order to switch among various different networks, the mobile device needs to be provisioned with profiles for connecting or attaching to various networks provided by different MNOs or service providers. These profiles include user's subscription information and network settings as it relates to a particular MNO or service provider. The combination of user's subscription information and the network settings allows the user to connect to a network (cellular and/or data network). These profiles are typically stored in subscriber identity modules (SIMs) of the mobile devices. SIMs are cards that may be inserted into a mobile device or may be in an electronic form, i.e., an embedded SIM card (eSIM). Thus, with an eSIM implementation, a given mobile device can be controlled to select, at any given time, from among the different MNOs supported by respective eSIM profiles.

While eSIMs or multiple SIM cards (typically two physical SIM cards) may provide a mobile device with a capability to switch among various networks (networks provided by various MNOs), the mobile device still needs to know when it might desirable to switch between two different MNOs. In an example embodiment, a controller, which tracks the location of the moving mobile device, determines an available network or best available network at a particular location and, when appropriate, causes the mobile device to switch from a first network to another network before losing connectivity, i.e., before encountering a dead zone in the first network. Quality of Service (QoS) parameters of the first network compared to other networks may also be taken into account in making a determination as to when to cause the mobile device to switch networks. That is, it may not be the case that a dead zone is the only scenario in which a switch between networks might be desirable.

As will be explained in more detail below, and in various example embodiments, network automation and service assurance or enhanced service assurance for a connected moving mobile device are provided. A controller may switch a mobile device to a different network based on a predictive algorithm in which a path being traveled by the mobile device is analyzed and dead zones (or other triggering events) of various networks along the path are determined so as to switch the mobile device to a different network prior to losing connectivity or service.

FIG. 1 is a view illustrating an environment 100 in which network connectivity switching for a mobile device is performed, according to an example embodiment. The environment 100 illustrates network coverage by various MNOs.

In the environment 100, a first BS 104-1 is one of many BSs of the first MNO 102-1 and a second BS 106-1 is one of many BSs of the second MNO 102-2. Although only the first MNO 102-1 and the second MNO 102-2 are depicted in FIG. 1, the number of MNOs is not limited and depends on a particular configuration of the environment 100. In FIG. 1, the MNOs are cellular service providers such that the first MNO 102-1 is a cellular service provider 1 and the second MNO 102-2 is a cellular service provider 2. Additionally, although only one BS of a respective MNO is depicted in FIG. 1, the number of BSs is not limited to one and depends on a particular configuration of the environment 100.

In FIG. 1, an IoT device such as a vehicle or a car 108 is moving along a road from Point A to Point B. Along the way, network connectivity may be provided to the car 108 by connecting to the first BS 104-1 of the MNO 102-1 in a first area 105 and by connecting to the second BS 106-1 of the second MNO 102-2 in a second area 107. The car 108 receives a strong signal (positive or negative high number of a received signal strength indicator (RSSI)) from the first BS 104-1 in the area 105 and a strong signal (RSSI) from the second BS 106-1 in the second area 107.

In FIG. 1, both the first BS 104-1 and the second BS 106-1 provide connectivity in an overlap area 109 (overlap in the network connectivity provided by the first MNO 102-1 and the second MNO 102-2). As indicated in FIG. 1, the car 108 is switched from a network of the first MNO 102-1 to a network of the second MNO 102-2 in the overlap area 109. As such, when the car 108 moves into the second area 107 the network connectivity or service is continued by the second BS 106-1 of the second MNO 102-2. In other words, by switching networks in the overlap area 109, the car 108 remains connected and does not experience a loss of service (or experiences minimal service downtime).

A connectivity management platform 200 facilitates the switching of networks. The connectivity management platform 200 tracks a location of the car 108 (current location or location in real-time) using, e.g., the global positioning system (GPS) location monitoring, as shown at 112. That is, the car 108 may periodically report its position to the connectivity management platform 200. Based on the detected location of the car 108, the connectivity management platform 200 communicates with the respective MNO to facilitate remote provisioning of the car 108 to attach or connect to the respective network of the MNO. The connectivity management platform 200 determines future locations along the path of the car 108 in which to switch networks for the car 108 and triggers the switching when the car 108 is tracked at these future locations.

For example, the connectivity management platform 200 uses subscription manager secure routing (SM-SR) defined by the Global System for Mobile Communications Association (GSMA) to enable secure download, enablement, disablement, or deletion of profiles from an eSIM 110 of the car 108. That is, an embedded universal integrated circuit card (eUICC) or eSIM may be provisioned remotely over-the-air (OTA) with various SIM profiles across multiple networks from a central management point i.e., the connectivity management platform 200). The SM-SR ensures secure transport of profile management commands such as loading a new profile, enabling, disabling, and deleting a profile on the eSIM 110.

As shown in FIG. 1, at 114, the SM-SR integration provides for remote provisioning with the first MNO 102-1 and at 116, the SM-SR integration provides for remote provisioning with the second MNO 102-2. When the car 108 is detected in the overlap area 109, the connectivity management platform 200 communicates, at 114, with the first MNO 102-1 via SM-SR to remotely provision the eSIM 110 of the car 108 to switch to the profile of the cellular service 2 (CS2), as opposed to the currently enabled profile of the cellular service 1 (CS1). When the car 108 is detected to leave the second area 107 of the second MNO 102-2, the connectivity management platform 200 communicates, at 116, with the second MNO 102-2 via SM-SR, to remotely re-provision the eSIM 110 of the car 108. That is, the currently enabled profile CS2 is disabled and another profile (such as CS1) may be re-enabled (not shown in FIG. 1). While only two networks are shown with respect to FIG. 1, this is but one configuration. The number of available profiles are not limited to two and will depend on a particular configuration. For example, in case there are multiple profiles on the eSIM 110, the next change is also decided based on the QoS of each network in the location to decide the best network to switch to. This may not necessarily be the same network from which it had switched from earlier.

Although not shown in FIG. 1, in an example embodiment, the connectivity management platform 200 may communicate with the second MNO 102-2 to obtain a temporary profile to attach a mobile device to the network of the second MNO 102-2. The connectivity management platform 200 may then download the temporary profile obtained from the second MNO 102-2 to the eSIM 110 of the mobile device and enable the temporary profile prior to the loss of connectivity i.e., in the overlap area 109.

Figure 2:
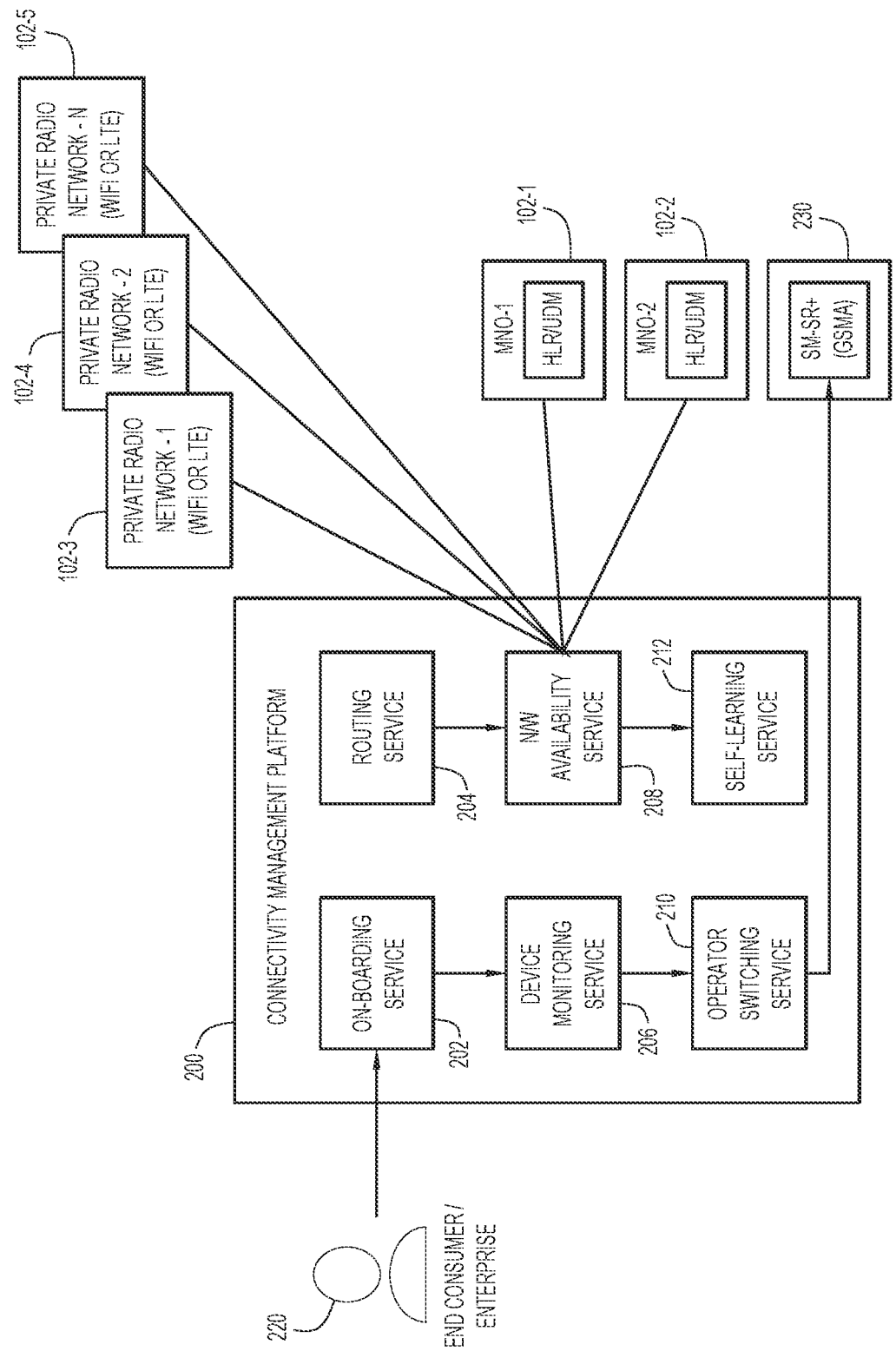
FIG. 2 is a block diagram illustrating an architecture of a connectivity management platform for proactively switching a mobile device to a different network based on predicting a future location of the mobile device and coverage provided by various networks, according to an example embodiment.

FIG. 2 is a block diagram illustrating an architecture of a connectivity management platform 200 for proactively switching a mobile device to a different network based on predicting a future location of the mobile device and coverage provided by various networks, according to an example embodiment. The connectivity management platform 200 may be cloud based such that its components or services are provided in a cloud (spread across various remote physical servers, for example). The connectivity management platform 200 may be a network controller, a data control center, or a digital network architecture controller (DNAC).

The connectivity management platform 200 connects to the first MNO 102-1 and the second MNO 102-2. Additionally, the connectivity management platform 200 connects to one or more private radio networks such as wireless local area network (WLAN) including Wi-Fi and long term evolution (LTE) private radio network including citizen broadband radio service (CBRS). In FIG. 2, the connectivity management platform 200 connects to a first private radio network operator 102-3, a second private radio network operator 102-4, and an nth private radio network operator 102-5. These private radio networks may be managed by different enterprises and/or service providers (network operators). In an example embodiment, one or more of the MNOs may include a fifth generation (5G) network provider or a $4^{th}$ generation (4G) LTE network provider of various standards developed by a third generation partnership project (3GPP) organization. One or more of the MNOs may include a home location register (HLR) or a unified data management (UDM) defined in the 5G network. The HLR/UDM is a database repository storing subscriber information (user identification and authorization information). Collectively, the first MNO 102-1, the second MNO 102-2, the first to nth private radio networks 102-3 to 102-5 are referred to as MNOs 102-1 to 102-5. The MNOs 102-1 to 102-5 may be managed by different operators or providers.

The connectivity management platform 200 determines when to switch the mobile device to a different network based on a predictive location algorithm and enables the switching of the mobile device to the different network based on the mobile device reaching the predicted location. The predicted locations are based on information obtained by connecting with various MNOs 102-1 to 102-5. In particular, the connectivity management platform 200 builds a network availability map by identifying respective dead zones for each of the MNOs 102-1 to 102-5. Using GPS or similar location based techniques (e.g., a navigation system which calculates the route for a mobile device based on input destination), the connectivity management platform 200 determines future movement of the mobile device. That is, the connectivity management platform 200 predicts a route or path to be traveled by the mobile device. Based on mapping the identified dead zones onto the route to be traveled, the connectivity management platform 200 computes a time and a future location along the route or path when the network switch needs to occur to avoid loss of connectivity or service for the mobile device.

In FIG. 2, the connectivity management platform 200 includes the following components: an on-boarding service 202, a routing service 204, a device monitoring service 206, a network (NW) availability service 208, operator switching service 210, and a self-learning service 212. While these components are shown as separate services, these components may be combined into one or more service depending on a particular implementation of the connectivity management platform 200. These services are implemented as a combination of hardware and software or maybe software services executed by a processor or a server, depending on a particular implementation.

The on-boarding service 202 provides an interface for on-boarding or registering a mobile device for enhanced monitoring. In FIG. 2, a mobile device is shown as an end consumer/enterprise 220 which may register one or more of its mobile devices such as a vehicle or a car 108 with the connectivity management platform 200 via the on-boarding service 202. For example, the on-boarding service 202 may receive a path or a route that the mobile device would like to travel or may receive a starting location or current location and a destination location. The location may be expressed in a form of GPS coordinates. Upon on-boarding the mobile device, the connectivity management platform is configured to track the location of the mobile device, predict its future path, and determine future locations along the path to switch networks for the mobile device, as detailed below.

The routing service 204 obtains information about one or more of the on-boarded or registered mobile device from the on-boarding service 202 and computes an optimal path for each of the on-boarded mobile devices from a starting point (or currently location) to an end point (a destination). For example, for the car 108 of FIG. 1, the routing service 204 obtains location information from the device monitoring service 206 and obtains network availability maps for the MNOs 102-1 to 102-5 from the NW availability service 208. The network availability maps may be specific to a current location of the car 108 and the predicted path to be traveled by the car 108. The routing service 204 may more accurately predict a path to be traveled from a current location of the car 108 based on input destination that may be obtained from the car 108 by the on-boarding service 202.

In any event, the routing service 204 estimates or predicts a path to be traveled by a mobile device using a map database such as google maps or other map services. Based on the predicted path and the obtained network availability maps, the routing service 204 determines future locations (estimated time and GPS coordinates) for switching network connectivity provided by various MNOs 102-1 to 102-5 and instructs the operator switching service 210 to provision the mobile device from an in-use MNO to a different MNO when the mobile device approaches the future locations along the predicted path.

The device monitoring service 206, mentioned above, monitors each on-boarded mobile device, including its current location by, e.g., tracking the GPS coordinates of a mobile device in real-time. Optionally, the device monitoring service 206 also periodically sends a heartbeat message to the mobile device and determines for each point in time, its current location. The device monitoring service 206 receives requests for location from the routing service 204 and/or from the operator switching service 210 and provides responses based on the requests. As an alternative or in addition, according to an example embodiment, the device monitoring service 206 may periodically check the location of the mobile device and provide the current location to the routing service 204 and/or the operator switching service 210.

The NW availability service 208 integrates or connects to different service providers (MNOs 102-1 to 102-5) to obtain information about cell coverage areas (including dead zones and QoS parameters in various areas) and integrates or connects to the self-learning service 212 to enhance information about cell coverage areas (including dead zones and QoS parameters). In other words, the NW availability service 208 is an interface which communicates with various MNOs 102-1 to 102-5 and obtains their network topology and network coverage areas.

The NW availability service 208 may provide only a portion of the obtained information based on the path predicted by the routing service 204. That is, the NW availability service 208 may receive a request from the routing service 204. The request includes the predicted path of the mobile device including the currently location of the mobile device. As an alternative, the request may identify a geographic area (GPS coordinates and radius or a set of GPS coordinates) for which the network availability maps are requested. The NW availability service 208 obtains the network availability maps for the requested geographic area from various MNOs 102-1 to 102-5 and provides them to the routing service 204. Optionally, the request may further identify two or more of the MNOs from various MNOs 102-1 to 102-5 so that the network availability maps are provided just for the MNOs identified in the request and not all available MNOs 102-1 to 102-5 because the mobile device may not have the capability to connect to one of these MNOs.

The self-learning service 212 enhances the network availability maps obtained by the NW availability service 208 by assimilating connectivity knowledge from a number of mobile device (in-progress fleets) operating at different locations in various networks so as to improve accuracy of the network availability maps. Although not shown in FIG. 2, the self-learning service 212 may provide updated network availability maps to the routing service 204, to the respective MNO, and/or to the NW availability service 208.

The operator switching service 210 receives instruction from the routing service 204 regarding when to switch networks along the path to be traveled by the mobile device. When the mobile device reaches one of the future locations determined for the switch by the routing service 204 (where the location is tracked by the device monitoring service 206), the operator switching service 210 switches networks to the network identified by the routing service 204. In particular, the operator switching service 210 integrates with or connects to a network operator's SM-SR component 230 to remotely provision a subscriber identity module (SIM) or eSIM of the mobile device by activating a subscriber profile for the network identified by the routing service 204. The operator switching service 210 integrates with an SM-SR component 230 of a respective network that currently provides network connectivity to the mobile device so as to OTA provision the mobile device to switch to another network. The routing service 204 is configured to connect to all MNOs 102-1 through 102-5 via respective SM-SR functions or interfaces to provision mobile devices to switch to a network of another MNO.

In an example embodiment, the connectivity management platform 200 obtains network availability map for each network service provider such as MNOs 102-1 to 102-5. The network availability maps may be obtained by the NW availability service 208 as further modified by the self-learning service 212. The connectivity management platform 200 computes dead zones along a path of a mobile device via the routing service 204. Based on the computed dead zones along the way, the routing service 204 instructs the operator switching service 210 regarding the future locations along the path for switching to a different network (a different MNO). The operator switching service 210 integrates with or connects to the SM-SR of the first MNO 102-1 and performs OTA provisioning of the eSIM of the mobile device. Based on the OTA provisioning, the subscriber profile corresponding to the first MNO 102-1 is disabled and the other subscriber profile is enabled so that the mobile device can connect to the different network of the different MNO.

FIGS. 3A-3I are views illustrating a method of proactively switching the network to which a mobile device is connected based on predicting future location of the mobile device and coverage provided by various networks, according to an example embodiment. The connectivity management platform 200 depicted in FIG. 2 executes the method in FIGS. 3A-3I.

Figure 3A:
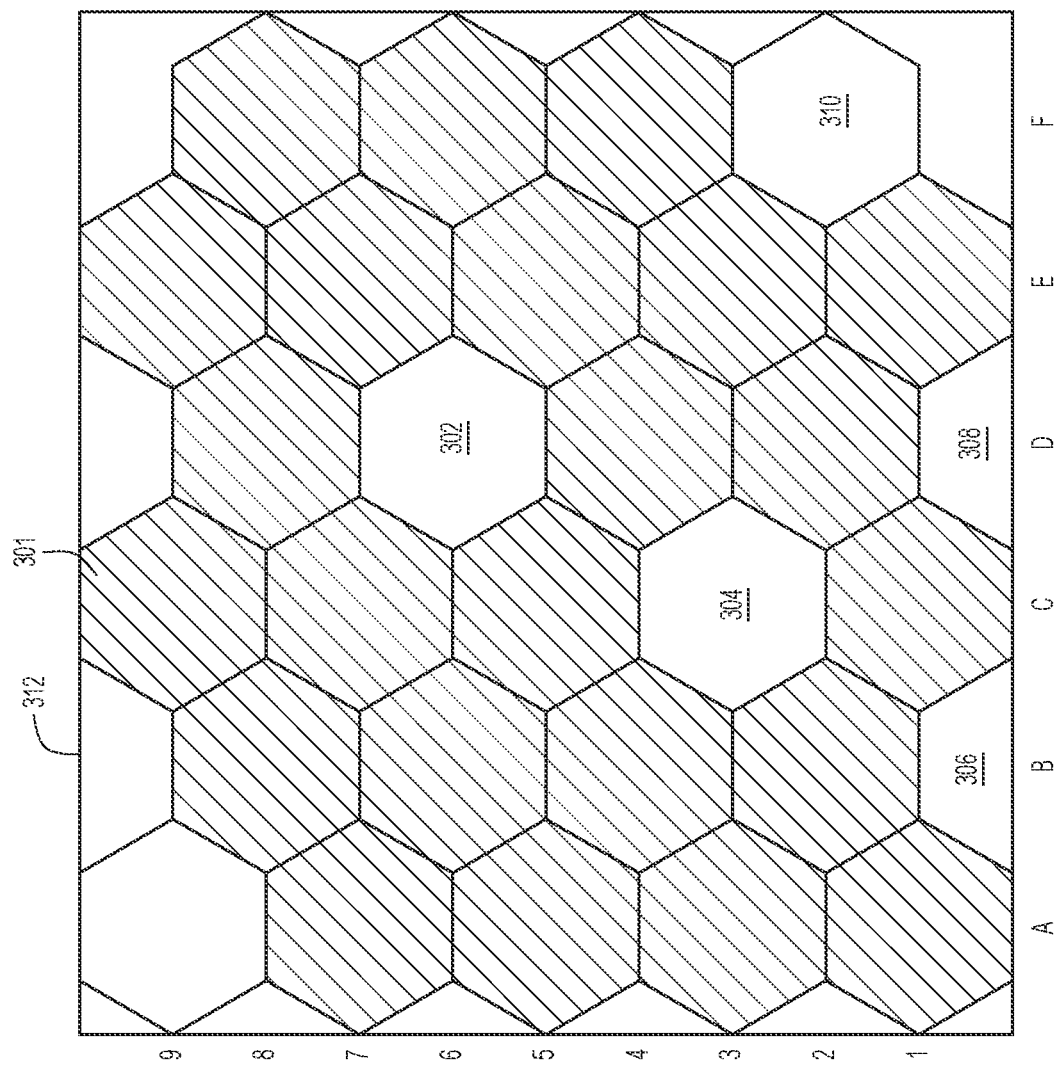

FIG. 3A is a view illustrating a first network coverage map 300 of the first MNO 102-1 obtained by the NW availability service 208 (shown in FIG. 2) from the first MNO 102-1. The first network coverage map 300 is based on network information (cell tower or BS locations, dead zones, signal strengths, etc.) obtained from the first MNO 102-1. The first network coverage map 300 is for a geographic area 312. The geographic area 312 may be predetermined based on a current location of the mobile device as provided by the routing service 204. The size of the geographic area 312 may vary depending on a particular configuration or implementation. The size of the geographic area 312 may be ½ mile radius from a current location, one mile from the current location, or more, by way of an example.

In FIG. 3A, first shaded hexagons 301 indicate first network coverage area based on cell tower locations of the first MNO 102-1. The white cells indicate dead zones in which the mobile device is not serviced by the network of the first MNO 102-1. In FIG. 3A, some of the dead zones are labeled as first set of dead zones 302, 304, 306, 308, and 310. Standard calculations are performed, as a half mile radius for example, which are be configurable per tower or BS type to know the cell coverage and compute the location of the first set of dead zones 302, 304, 306, 308, and 310.

FIG. 3B is a view illustrating a road map 320, according to an example embodiment. The road map 320 may be obtained from various map services such as google maps. The connectivity management platform 200 via the routing service 204 may obtain various maps relevant to the onboarded or connected mobile device. Using the location based routing techniques, the path or the route of the moving connected mobile device may be determined. Additionally, on-going network coverage learning based on the mobile device moving along different routes and their connectivity status may be provided. The route or path being monitored is based on the current location of the mobile device and optionally, obtained destination point.

In FIG. 3B, the road map 320 includes a number of roads 322 for the geographic area 312. The geographic area 312 is the same geographic area 312 depicted in FIG. 3A. The geographic area 312 is selected based on tracking the location of the mobile device and may correspond to a route from a starting point (point A in FIG. 1) or a current location of the mobile device to a destination point (point B in FIG. 1) or a predicted future point predicted to be traveled by the mobile device based on its current location. For example, the location of the mobile device may be at one of (a, 9), (a, 1), (f, 1), or (f, 9).

Figure 3C:
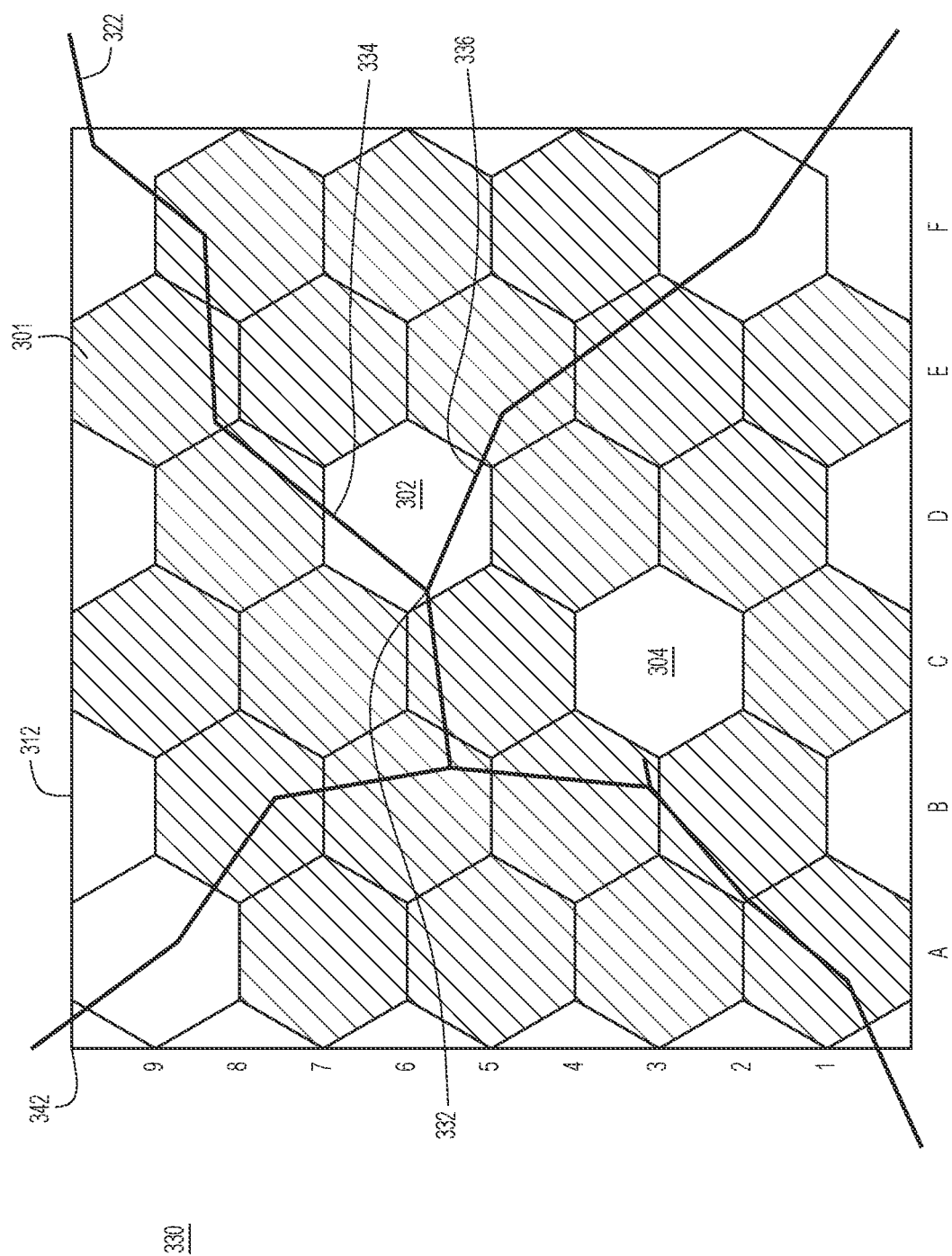

FIG. 3C is a view illustrating a combined map 330, according to an example embodiment. The routing service 204 of the connectivity management platform 200 generates the combined map 330 by combining or overlaying various networks. The combined map 330 is generated for the geographic area 312. The combined map 330 includes a first layer and a second layer overplayed on one another. The first layer is the first network coverage map 300 for the geographic area 312 depicted in FIG. 3A and the second layer is the road map 320 for the geographic area 312 depicted in FIG. 3B. By combining these two layers, the routing service 204 computes, predicts, or identifies the dead zones along the route to be traveled by the mobile device.

In FIG. 3C, the mobile device may lose coverage in the first MNO 102-1 at future locations 332, 334, and 336 along the roads 322. When the mobile device loses coverage, the mobile device will not be able to connect to the first network and/or received signal strength indicator (RSSI) may be weak (below a predetermined threshold). At these future locations 332, 334, and 336, connectivity provided to the mobile device using the first network will be below an acceptable value (a predetermined threshold).

Figure 3D:
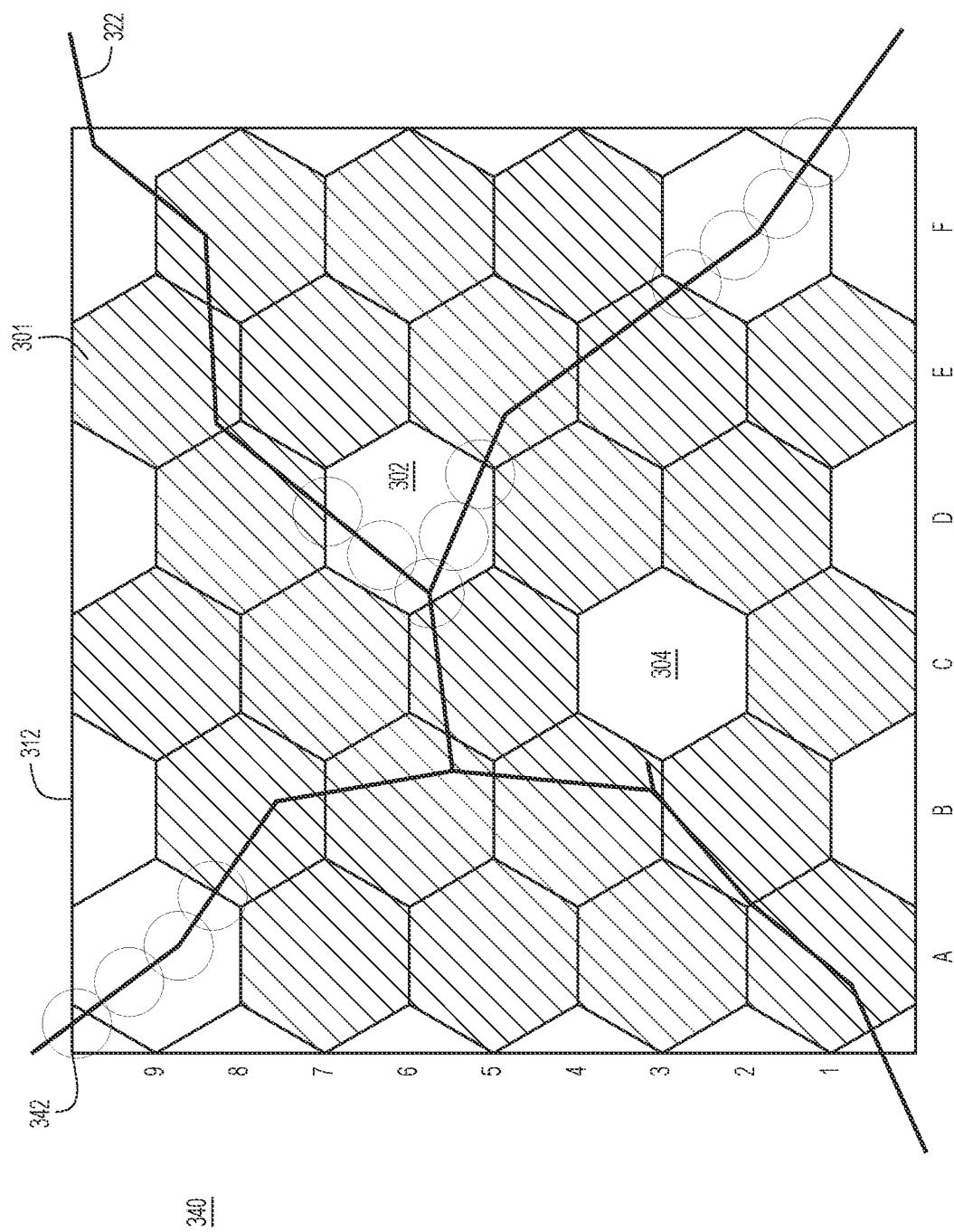

FIG. 3D is a view illustrating a first dead zone map 340 of the first MNO 102-1 along the roads 322, according to an example embodiment. Based on the combined map 330, the routing service 204 of the connectivity management platform 200 identifies a first set of dead zone locations 342 along the roads 322 on the first dead zone map 340. The first set of dead zone locations 342 is depicted with dark circles identifying where the first MNO 102-1 has no coverage. That is, the mobile device loses coverage of the first network at the first set of dead zone locations 342 along the roads 322.

Figure 3E:
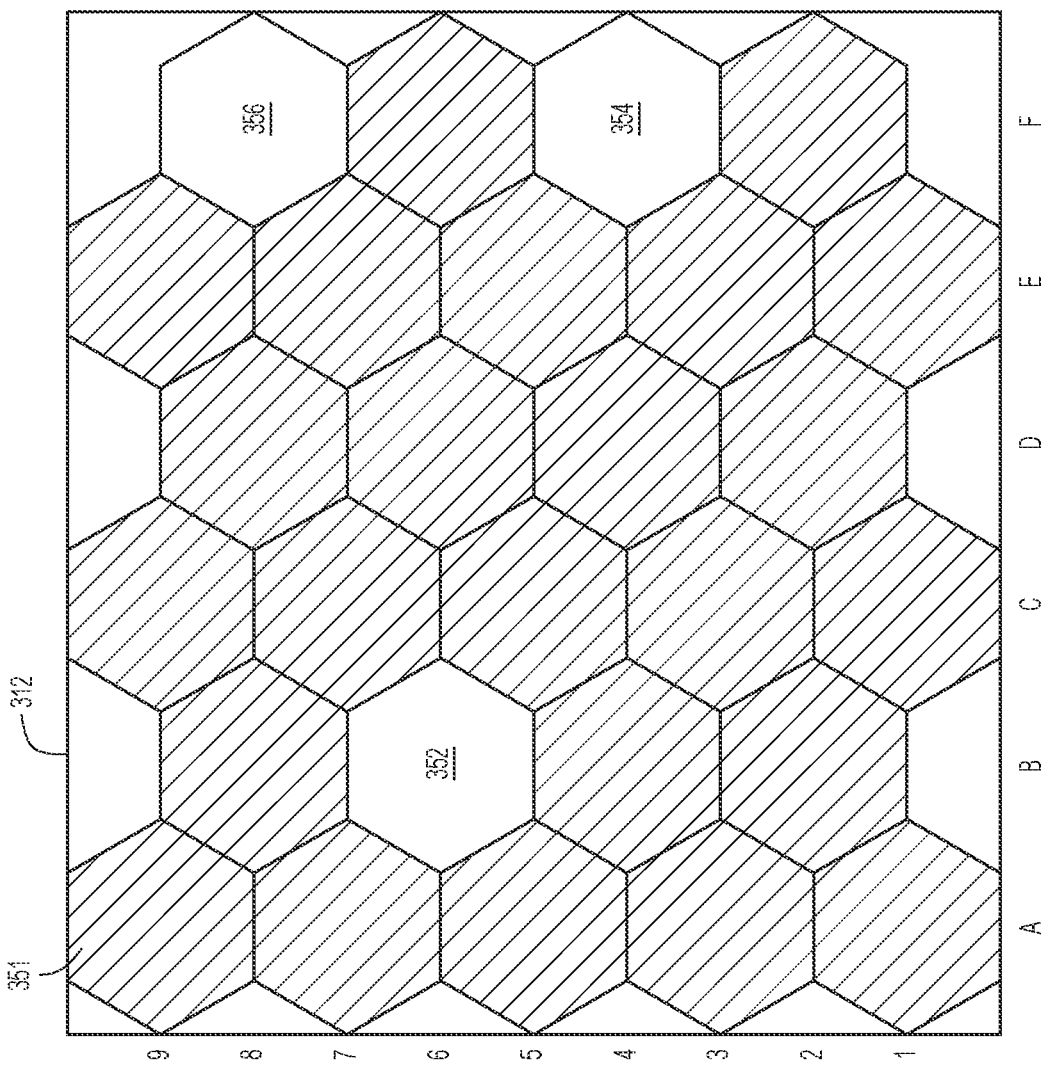

FIG. 3E is a view illustrating a second network coverage map 350 of the second MNO 102-2 obtained by the NW availability service 208 (shown in FIG. 2) from the second MNO 102-2, according to an example embodiment. The second network coverage map 350 is based on network information (cell tower or BS locations, dead zones, signal strengths, etc.) obtained from the second MNO 102-2. The second network coverage map 350 is for the same geographic area 312. In FIG. 3E, second shaded hexagons 351 indicate network coverage area based on cell tower locations of the second MNO 102-2. The white cells indicate dead zones in which the mobile device is not serviced by the network of the second MNO 102-2. In FIG. 3E, some of the dead zones are labeled as a second set of dead zones 352, 354, and 356. Standard calculations are performed, as a half mile radius for example, which may be configurable per tower or BS type to know the cell coverage and compute or identify the location of the second set of dead zones 352, 354, and 356.

Figure 3F:
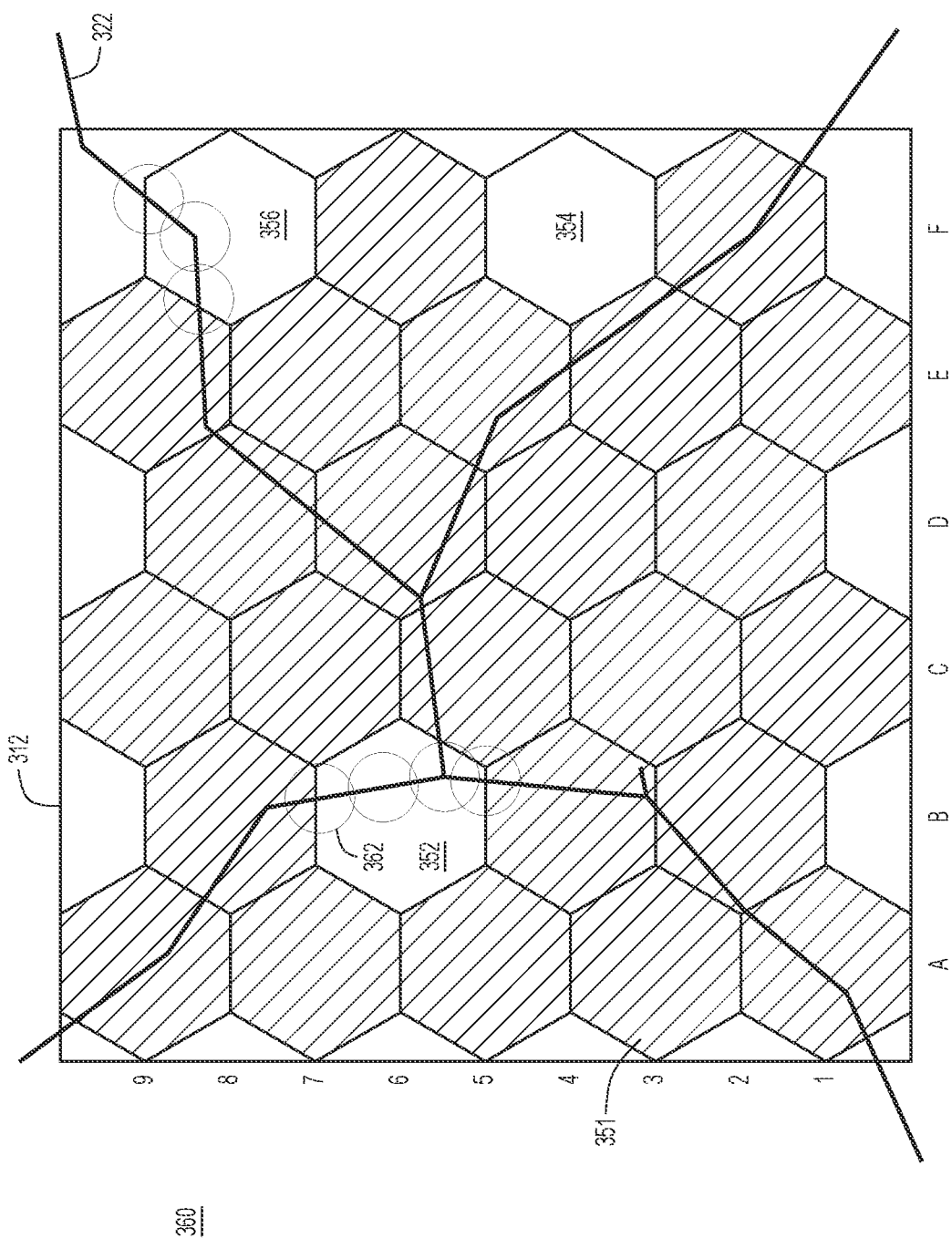

FIG. 3F is a view illustrating a second dead zone map 360 of the second MNO 102-2 along the roads 322, according to an example embodiment. The road map 320 (layer 2) is combined with the second network coverage map 350 of the second MNO 102-2 (layer 3). Based on the layer 2 with layer 3 combination, the routing service 204 of the connectivity management platform 200 identifies a second set of dead zone locations 362 along the roads 322. The second set of dead zone locations 362 is depicted with dark circles identifying where the second MNO 102-2 has no coverage along the roads 322 in the second set of dead zones 352, 354, and 356.

Figure 3G:
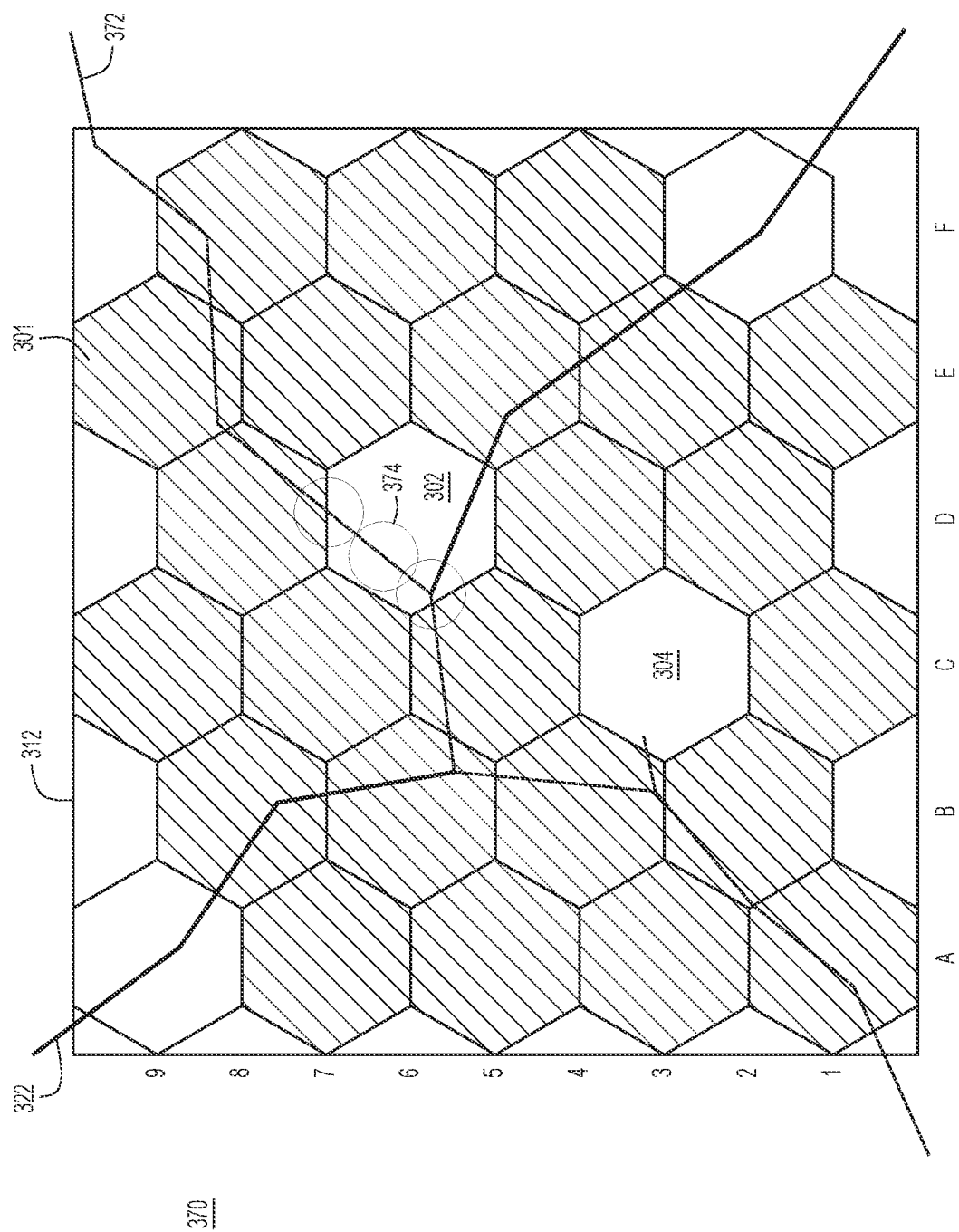

FIG. 3G is a view illustrating a third dead zone map 370 based on a predicted location of the mobile device and coverage of the first network serviced by the first MNO 102-1, according to an example embodiment. The third dead zone map 370 is for the same geographic area 312, the same roads 322, and the same first network coverage map 300 including the dead zones of the first dead zone map 340, detailed descriptions of which are omitted for the sake of brevity.

The routing service 204 of the connectivity management platform 200 (FIG. 2) obtains the location the mobile device (not shown) and determines that the mobile device has an active connection with the first network serviced by the first MNO 102-1. Additionally, based on the tracked location of the mobile device (tracked by the device monitoring service 206), the routing service 204 predicts that the mobile device is to travel on a device path 372 depicted with a thick line in FIG. 3G. The routing service 204 then identifies a third set of dead zone locations 374 that are to be encountered by the mobile device along the device path 372. The third set of dead zone locations 374 is depicted with dark circles in FIG. 3G and identify where the first MNO 102-1 has no coverage along the device path 372.

Figure 3H:
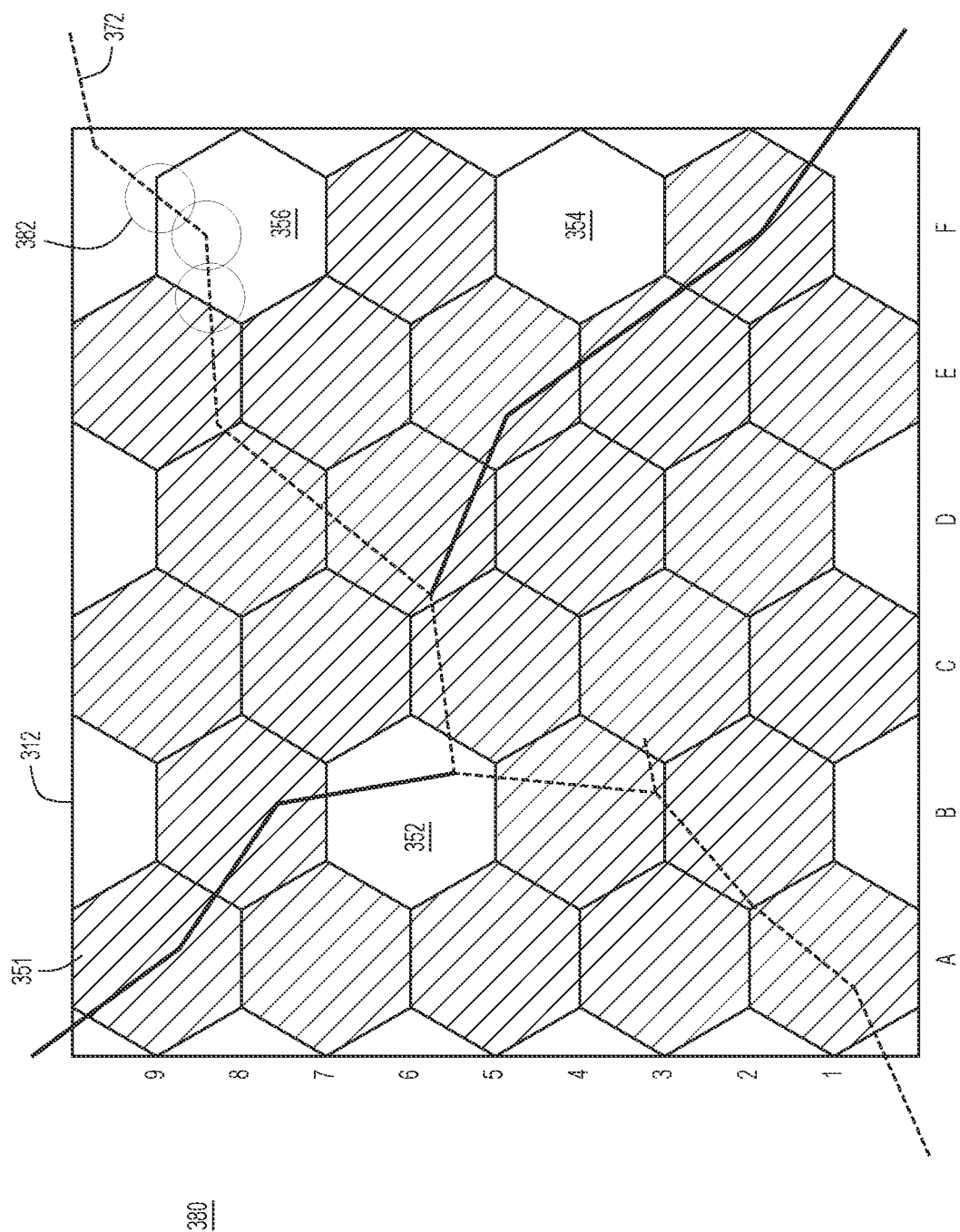

FIG. 3H is a view illustrating a fourth dead zone map 380 based on a predicted location of the mobile device and coverage of the second network serviced by the second MNO 102-2, according to an example embodiment. The fourth dead zone map 380 includes the same geographic area 312, the same roads 322, and the same second network coverage map 350 including the dead zones 352, 354, and 356 of the second dead zone map 360, detailed descriptions of which are omitted for the sake of brevity.

The routing service 204 of the connectivity management platform 200 obtains the location the mobile device (not shown) and determines that the mobile device has an active connection with the first network serviced by the first MNO 102-1. Additionally, based on the tracked location of the mobile device (tracked by the device monitoring service 206), the routing service 204 predicts that the mobile device is to travel on a device path 372 depicted with the thick line in FIG. 3H. The routing service 204 then identifies a fourth set of dead zone locations 382 that are to be encountered by the mobile device along the device path 372. The fourth set of dead zone locations 382 is depicted with dark circles in FIG. 3H and identify where the second MNO 102-2 has no coverage along the device path 372.

Figure 3I:
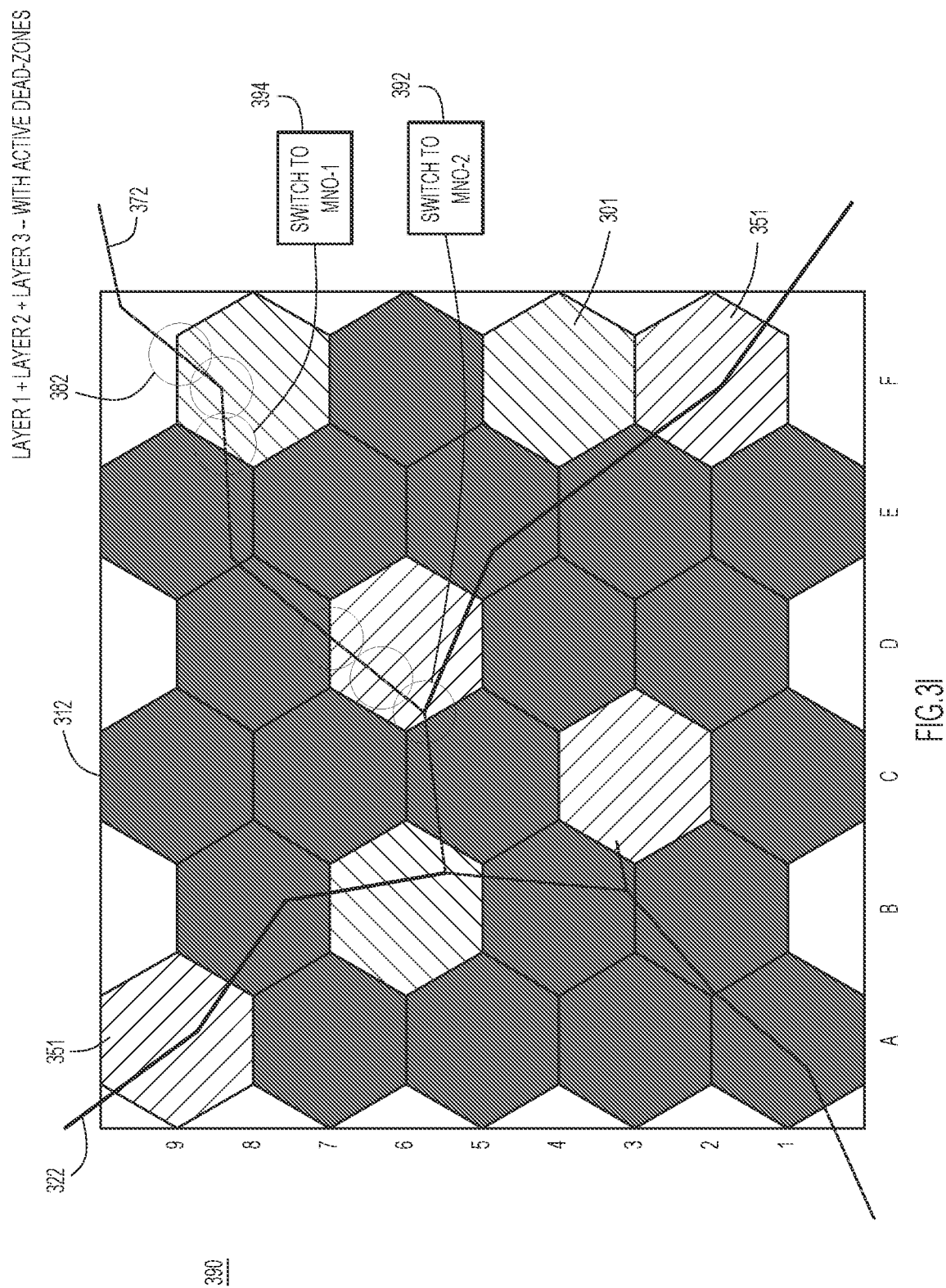

FIG. 3I is a view illustrating a network switching map 390, according to an example embodiment. The routing service 204 of the connectivity management platform 200 computes or generates a network switching plan specific to the mobile device (not shown). Based on network availability maps and the predicted device path, the network switching map 390 is determined beforehand.

As shown in FIG. 3I, the mobile device is switched to the second network operated by the second MNO 102-2 at a first future location 392 and is then switched back to the first network at a second future location 394. In the network switching map 390, light shaded hexagons indicate network coverage area of both networks (the first network and the second network) and first shaded hexagons 301 indicate network coverage area serviced only by the first network and not the second network and the second shaded hexagons 351 indicate network coverage area serviced only by the second network and not the first network.

Additionally, the network switching map 390 includes roads 322 and the device path 372 shown in a thick line. The network switching map 390 is a combination of the first network coverage map 300, the second network coverage map 350, and active dead zones i.e., dead zones specific to the mobile device based on in-use network and the device path 372. The network switching map 390 combines the third dead zone map 370 and the fourth dead zone map 380. Both of these maps are specific to the mobile device. Based on the network switching map 390, the routing service 204 determines, generates, or devises a switching plan that includes the first future location 392 at which the mobile device is to switch from the first network to the second network and the second future location 394 at which the mobile device is to switch back from the second network to the first network.

The routing service 204 provides the network switching plan to the operator switching service 210, which performs the switching. As per GSMA standard, a connected mobile device may be equipped with an eSIM and different network provider profiles may be preloaded and registered therein. Once connected, as the mobile device approaches one of the identified dead zones computed or identified based on the GPS monitoring from connectivity management platform 200, remote over the air (OTA) provisioning can be performed and/or a SIM switch can be triggered, from the connectivity management platform 200 to the mobile device via the SM-SR component of a respective MNO. Accordingly, the mobile device is switched to a different network prior to encountering the dead zone.

According to an example embodiment, based on above operations, when mapped together, an end-to-end path with available network connectivity can be identified for any vehicle route. Although FIGS. 3A-3I depict only two networks serviced by two different MNOs, the number of networks is not limited to two. Further, more than two networks may be mapped or combined together to determine switch locations such as the networks depicted in FIG. 2. The number of networks depends on a particular implementation and the capabilities of the mobile device i.e., subscriber profiles available to the mobile device and/or service providers to which the mobile device is subscribed.

According to various example embodiments, the connectivity management platform 200 computes or identifies dead zones, potential areas where network coverage is not available. The connectivity management platform 200 uses cell ranges and road topology based mobile prediction to predetermine the loss of network and QoS degradation on the path to be traveled by a mobile device and seamlessly transitions the mobile device from one service provider to another without service disruption. The connectivity management platform 200 computes or identifies time and location where network switch is required and provides an internal self-learning system to gain intelligence on the network availability and the perceived QoS.

According to one example embodiments, maps of FIGS. 3A-3F are computed by the connectivity management platform prior to or independently of tracking registered mobile device. Based on a device being on-boarded by the on-boarding service 202, the routing service 204 computes the maps of FIGS. 3G-3I.

Figure 4:
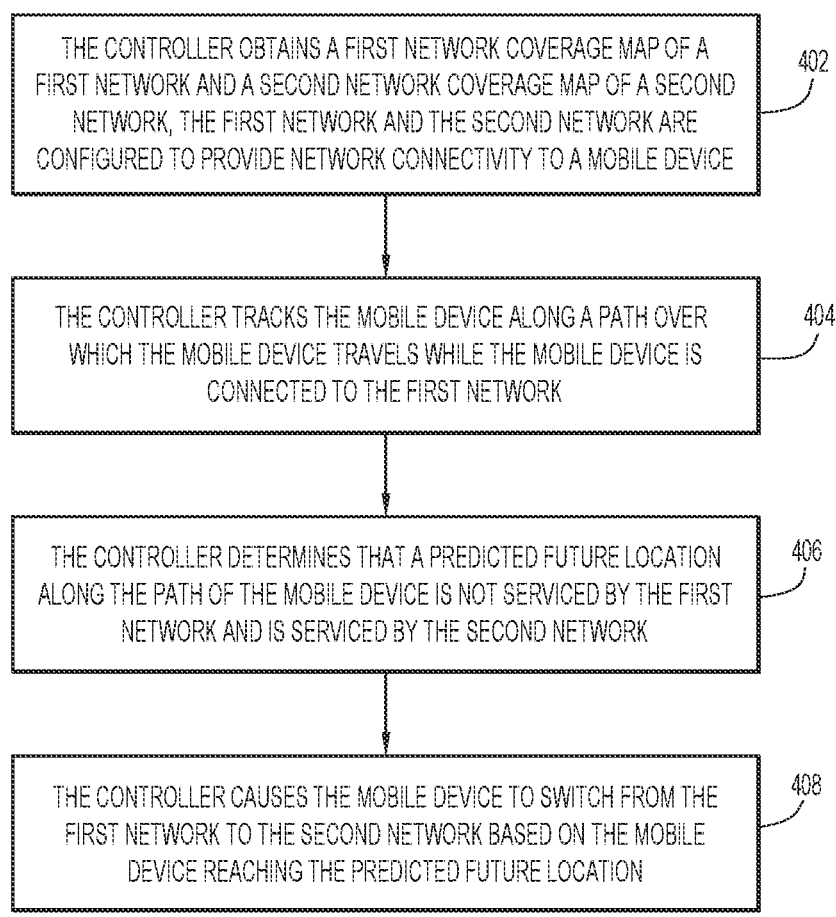
FIG. 4 is a flowchart illustrating a method of proactively switching a mobile device to a different network based on predicting a future location of the mobile device and coverage provided by various networks, according to an example embodiment.

FIG. 4 is a flowchart illustrating a method 400 of proactively switching a mobile device to a different network based on predicting future location of the mobile device and coverage provided by various networks, according to an example embodiment. The method 400 is performed by a controller which executes the connectivity management platform 200 described with reference to FIGS. 1 and 2.

At 402, the controller obtains a first network coverage map of a first network and a second network coverage map of a second network. The first network and the second network are configured to provide network connectivity to a mobile device.

At 404, the controller tracks the mobile device along a path over which the mobile device travels while the mobile device is connected to the first network and at 406, the controller determines that a predicted future location along the path of the mobile device is not serviced by the first network and is serviced by the second network.

At 408, the controller causes the mobile device to switch from the first network to the second network based on the mobile device reaching the predicted future location.

According to one or more example embodiments, the causing operation 408 includes the controller communicating with the mobile device, via the first network, to provision the mobile device to attach to the second network.

According to one or more example embodiments, the obtaining operation 402 includes obtaining, by the controller from a first mobile network operator, the first network coverage map of the first network including information about at least one of one or more cell coverage areas of the first network, one or more dead zones of the first network, or one or more quality of service (QoS) parameters in the one or more cell coverage areas of the first network and obtaining, by the controller from a second mobile network operator different from the first mobile network operator, the second network coverage map of the second network including information about at least one of one or more cell coverage areas of the second network, one or more dead zones of the second network, or one or more quality of service (QoS) parameters in the one or more cell coverage areas of the second network.

According to one or more example embodiments, the method 400 further includes the controller integrating into at least one of the first network coverage map or the second network coverage map, real-time connectivity knowledge obtained from a plurality of other mobile devices operating at different locations in the first network or the second network.

According to one or more example embodiments, each of the first network and the second network is one of a fifth generation cellular network, a fourth generation cellular network, a long term evolution (LTE) cellular network, or a private radio network including one of a wireless local network, an LTE private radio network, and citizens broadband radio service network.

According to one or more example embodiments, the determining operation 406 includes combining, by the controller, the path with the first network coverage map and the second network coverage map and identifying, by the controller, at least one dead zone of the first network along the path based on the path being combined with the first network coverage map and the second network coverage map. The at least one dead zone encompasses the predicted future location.

According to one or more example embodiments, the method 400 further includes determining, by the controller, that another predicted future location along the path over which the mobile device travels is not serviced by the second network based on identifying the at least one dead zone and causing, by the controller, the mobile device to switch from the second network to the first network or one of a plurality of third networks configured to provide network connectivity to the mobile device, based on the mobile device reaching the another predicted future location.

According to one or more example embodiments, the causing operation 408 includes connecting, by the controller, with the mobile device via a subscriber management secure routing service of the first network and causing, by the controller, via the subscriber management secure routing service of the first network, over-the-air (OTA) provisioning of the mobile device to disable a first profile for connecting the mobile device to the first network and to enable a second profile for connecting the mobile device to the second network.

According to one or more example embodiments, the causing operation 408 includes remotely provisioning, by the controller, via the first network, the mobile device by activating a subscriber profile stored in an embedded subscriber identity module of the mobile device. The subscriber profile enables the mobile device to connect to the second network.

Figure 5:
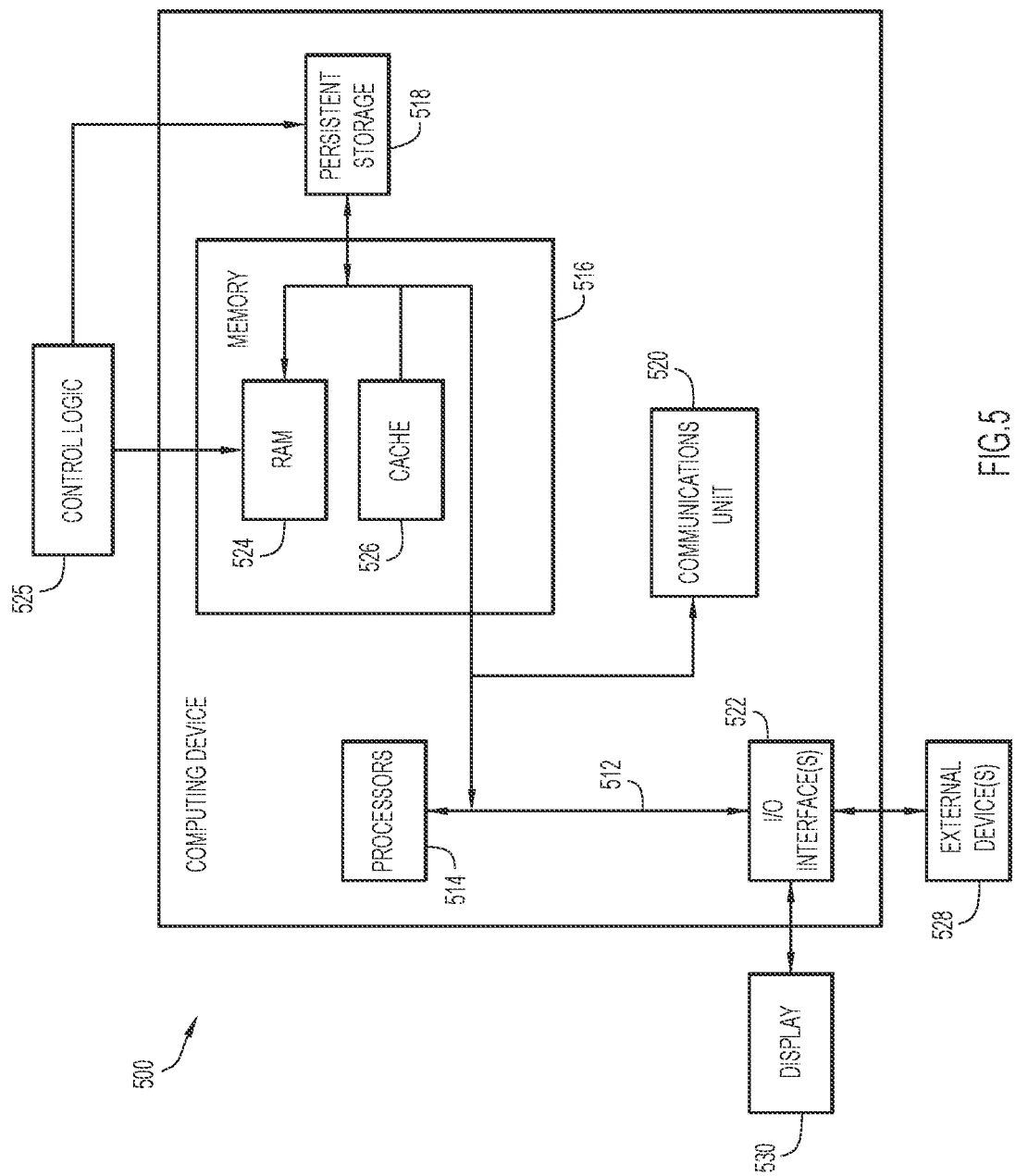
FIG. 5 is a hardware block diagram of a computing device configured to cause a switch of a mobile device to a different network based on predicting future location of the mobile device and coverage provided by various networks, according to various example embodiments.

FIG. 5 is a hardware block diagram of a computing device 500 configured to cause a switch of a mobile device to a different network based on predicting future location of the mobile device and coverage provided by various networks, according to various example embodiments. The computing device 500 is generally representative of a controller that executes the connectivity management platform 200 shown in FIG. 2. The computing device 500 performs the functions of a controller or a device that performs operations described herein in connection with FIGS. 1-3I.

It should be appreciated that FIG. 5 provides only an illustration of various embodiments and does not imply any limitations with regard to the environments in which different embodiments may be implemented. Many modifications to the depicted environment may be made. The methods explained above may be executed by one or more processors of a servicer and/or a network equipment.

As depicted, the computing device 500 includes a bus 512, which provides communications between computer processor(s) 514, a memory 516, a persistent storage 518, communications unit 520, and input/output (I/O) interface(s) 522. The bus 512 can be implemented with any architecture designed for passing data and/or control information between processors (such as microprocessors, communications and network processors, etc.), system memory, peripheral devices, and any other hardware components within a system. For example, the bus 512 can be implemented with one or more buses.

The memory 516 and persistent storage 518 are computer readable storage media. In the depicted embodiment, the memory 516 includes a random access memory (RAM) 524 and a cache (cache memory) 526. In general, the memory 516 can include any suitable volatile or non-volatile computer readable storage media that stores instructions for the control logic 525.

The control logic 525 includes instructions that, when executed by the computer processor(s) 514, cause the computing device 500 to perform one or more of the methods described herein including a method of causing a switch of a mobile device to a different network based on predicting future location of the mobile device and coverage provided by various networks. The control logic 525 may be stored in the memory 516 or the persistent storage 518 for execution by the computer processor(s) 514.

One or more programs may be stored in persistent storage 518 for execution by one or more of the respective computer processor(s) 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions, computer executable instructions, or digital information.

The media used by the persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

The communications unit 520, in these examples, provides for communications with other data processing systems or devices. In these examples, communications unit 520 includes one or more network interface cards. Communications unit 520 may provide communications through the use of either or both physical (wired) and wireless communications links.

The I/O interface(s) 522 allows for input and output of data with other devices that may be connected to the computing device 500. For example, the I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. The display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing system employed by the present embodiments may be implemented by any personal or other type of computer or processing system (e.g., desktop, laptop, personal data assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, wireless access network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, virtual private network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions or computer executable instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In still another example embodiment, a controller (an apparatus) is provided that includes a communication interface configured to enable network communications, a memory configured to store executable instructions, and a processor coupled to the communication interface and the memory and configured to perform operations. The operations include obtaining a first network coverage map of a first network and a second network coverage map of a second network. The first network and the second network are configured to provide network connectivity to a mobile device. The operations further include tracking the mobile device along a path over which the mobile device travels while the mobile device is connected to the first network, determining that a predicted future location along the path of the mobile device is not serviced by the first network and is serviced by the second network, and causing the mobile device to switch from the first network to the second network based on the mobile device reaching the predicted future location.

According to one or more example embodiments, the processor performs causing the mobile device to switch from the first network to the second network based on the mobile device reaching the predicted future location by communicating with the mobile device, via the first network, to provision the mobile device to attach to the second network.

According to one or more example embodiments, the processor performs obtaining the first network coverage map of the first network and the second network coverage map of the second network by obtaining, from a first mobile network operator, the first network coverage map of the first network including information about at least one of one or more cell coverage areas of the first network, one or more dead zones of the first network, or one or more quality of service (QoS) parameters in the one or more cell coverage areas of the first network, and by obtaining, from a second mobile network operator different from the first mobile network operator, the second network coverage map of the second network including information about at least one of one or more cell coverage areas of the second network, one or more dead zones of the second network, or one or more QoS parameters in the one or more cell coverage areas of the second network.

According to one or more example embodiments, the processor is further configured to perform operations including integrating into at least one of the first network coverage map or the second network coverage map, real-time connectivity knowledge obtained from a plurality of other mobile devices operating at different locations in the first network or the second network.

According to one or more example embodiments, each of the first network and the second network is one of a fifth generation cellular network, a fourth generation cellular network, a long term evolution (LTE) cellular network, or a private radio network including one of a wireless local network, an LTE private radio network, and citizens broadband radio service network.

In yet another embodiment, one or more non-transitory computer readable storage media encoded with software are provided. The software includes computer executable instructions. When the software is executed, e.g., by a processor, they cause the processor to perform operations. The operations include obtaining a first network coverage map of a first network and a second network coverage map of a second network. The first network and the second network are configured to provide network connectivity to a mobile device. The operations further include tracking the mobile device along a path over which the mobile device travels while the mobile device is connected to the first network, determining that a predicted future location along the path of the mobile device is not serviced by the first network and is serviced by the second network, and causing the mobile device to switch from the first network to the second network based on the mobile device reaching the predicted future location.

According to one or more example embodiments, the causing the mobile device to switch from the first network to the second network based on the mobile device reaching the predicted future location includes communicating with the mobile device, via the first network, to provision the mobile device to attach to the second network.

According to one or more example embodiments, the obtaining the first network coverage map of the first network and the second network coverage map of the second network includes obtaining, from a first mobile network operator, the first network coverage map of the first network including information about at least one of one or more cell coverage areas of the first network, one or more dead zones of the first network, or one or more quality of service (QoS) parameters in the one or more cell coverage areas of the first network, and obtaining, from a second mobile network operator different from the first mobile network operator, the second network coverage map of the second network including information about at least one of one or more cell coverage areas of the second network, one or more dead zones of the second network, or one or more QoS parameters in the one or more cell coverage areas of the second network.

According to one or more example embodiments, the operations further include integrating into at least one of the first network coverage map or the second network coverage map, real-time connectivity knowledge obtained from a plurality of other mobile devices operating at different locations in the first network or the second network.

According to one or more example embodiments, each of the first network and the second network is one of a fifth generation cellular network, a fourth generation cellular network, a long term evolution (LTE) cellular network, or a private radio network including one of a wireless local network, an LTE private radio network, and citizens broadband radio service network.

According to one or more example embodiments, the determining that the predicted future location along the path of the mobile device is not serviced by the first network includes: combining, by the controller, the path with the first network coverage map and the second network coverage map and identifying at least one dead zone of the first network along the path based on the path being combined with the first network coverage map and the second network coverage map. The at least one dead zone encompasses the predicted future location.

Techniques described herein compute dead zones of various network providers along a route of a mobile device and based on the computed dead zones, the mobile device is switched prior to encountering connectivity loss. Seamless transition between networks is provided based on a predetermined route of a mobile device and determined dead zones within various network topologies.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining, by a controller, a first network coverage map of a first network and a second network coverage map of a second network, wherein the first network and the second network are configured to provide network connectivity to a mobile device;
obtaining, by the controller, a road map for a geographical area;
generating, by the controller, a combined map by combining the first network coverage map with the road map;
tracking, by the controller, the mobile device along a path over which the mobile device travels while the mobile device is connected to the first network;
generating, by the controller, a network switching map specific to the mobile device based on determining, using the combined map, at least one dead zone along the path of the mobile device, wherein the at least one dead zone is an area encountered along the path that is not serviced by the first network and is serviced by the second network;
determining, based on the network switching map, by the controller, that a predicted future location along the path of the mobile device is within the at least one dead zone; and
causing, by the controller, the mobile device to switch from the first network to the second network based on the mobile device reaching the predicted future location and the network switching map.

2. The method of claim 1, wherein causing, by the controller, the mobile device to switch from the first network to the second network based on the mobile device reaching the predicted future location includes:
communicating, by the controller with the mobile device, via the first network to provision the mobile device to attach to the second network.

3. The method of claim 1, wherein obtaining, by the controller, the first network coverage map of the first network and the second network coverage map of the second network includes:
obtaining, by the controller from a first mobile network operator, the first network coverage map of the first network including information about at least one of one or more cell coverage areas of the first network, one or more dead zones of the first network, or one or more quality of service (QoS) parameters in the one or more cell coverage areas of the first network, and
obtaining, by the controller from a second mobile network operator different from the first mobile network operator, the second network coverage map of the second network including information about at least one of one or more cell coverage areas of the second network, one or more dead zones of the second network, or one or more QoS parameters in the one or more cell coverage areas of the second network.

4. The method of claim 3, further comprising:
integrating, by the controller, into at least one of the first network coverage map or the second network coverage map, real-time connectivity knowledge obtained from a plurality of other mobile devices operating at different locations in the first network or the second network.

5. The method of claim 1, wherein each of the first network and the second network is one of a fifth generation cellular network, a fourth generation cellular network, a long term evolution (LTE) cellular network, or a private radio network including one of a wireless local network, an LTE private radio network, and citizens broadband radio service network.

6. The method of claim 1, wherein determining, by the controller, that the predicted future location along the path of the mobile device is not serviced by the first network includes:
combining, by the controller, the path with the first network coverage map and the second network coverage map; and
identifying, by the controller, the at least one dead zone of the first network encountered along the path based on the path being combined with the first network coverage map and the second network coverage map, the at least one dead zone encompassing the predicted future location.

7. The method of claim 6, further comprising:
determining, by the controller, that another predicted future location along the path over which the mobile device travels is not serviced by the second network based on identifying the at least one dead zone of the second network; and
causing, by the controller, the mobile device to switch from the second network to the first network or one of a plurality of third networks configured to provide network connectivity to the mobile device, based on the mobile device reaching the another predicted future location.

8. The method of claim 1, wherein causing, by the controller, the mobile device to switch from the first network to the second network based on the mobile device reaching the predicted future location includes:
connecting, by the controller, with the mobile device via a subscriber management secure routing service of the first network; and
causing, by the controller, via the subscriber management secure routing service of the first network, over-the-air (OTA) provisioning of the mobile device to disable a first profile for connecting the mobile device to the first network and to enable a second profile for connecting the mobile device to the second network.

9. The method of claim 1, wherein causing, by the controller, the mobile device to switch from the first network to the second network based on the mobile device reaching the predicted future location includes:
   remotely provisioning, by the controller, via the first network, the mobile device by activating a subscriber profile stored in an embedded subscriber identity module of the mobile device, wherein the subscriber profile enables the mobile device to connect to the second network.

10. The method of claim 1, further comprising:
   identifying, by the controller, a dead zone of the second network along the path, wherein the controller is a connectivity management platform configured to obtain coverage maps of a plurality of networks including the first network and the second network.

11. An apparatus comprising:
   a communication interface configured to enable network communications on a mobile network;
   a memory configured to store executable instructions; and
   a processor coupled to the communication interface and the memory and configured to perform operations including:
      obtaining a first network coverage map of a first network and a second network coverage map of a second network, wherein the first network and the second network are configured to provide network connectivity to a mobile device;
      obtaining a road map for a geographical area;
      generating a combined map by combining the first network coverage map with the road map;
      tracking the mobile device along a path over which the mobile device travels while the mobile device is connected to the first network;
      generating a network switching map specific to the mobile device based on determining, using the combined map, at least one dead zone along the path of the mobile device, wherein the at least one dead zone is an area encountered along the path that is not serviced by the first network and is serviced by the second network;
      determining, based on the network switching map, that a predicted future location along the path of the mobile device is within the at least one dead zone; and
      causing the mobile device to switch from the first network to the second network based on the mobile device reaching the predicted future location and the network switching map.

12. The apparatus of claim 11, wherein the processor performs causing the mobile device to switch from the first network to the second network based on the mobile device reaching the predicted future location by communicating with the mobile device, via the first network, to provision the mobile device to attach to the second network.

13. The apparatus of claim 11, wherein the processor performs obtaining the first network coverage map of the first network and the second network coverage map of the second network by:
   obtaining, from a first mobile network operator, the first network coverage map of the first network including information about at least one of one or more cell coverage areas of the first network, one or more dead zones of the first network, or one or more quality of service (QoS) parameters in the one or more cell coverage areas of the first network, and
   obtaining, from a second mobile network operator different from the first mobile network operator, the second network coverage map of the second network including information about at least one of one or more cell coverage areas of the second network, one or more dead zones of the second network, or one or more QoS parameters in the one or more cell coverage areas of the second network.

14. The apparatus of claim 13, wherein the processor is further configured to perform the operations including:
   integrating into at least one of the first network coverage map or the second network coverage map, real-time connectivity knowledge obtained from a plurality of other mobile devices operating at different locations in the first network or the second network.

15. The apparatus of claim 11, wherein each of the first network and the second network is one of a fifth generation cellular network, a fourth generation cellular network, a long term evolution (LTE) cellular network, or a private radio network including one of a wireless local network, an LTE private radio network, and citizens broadband radio service network.

16. One or more non-transitory computer readable storage media encoded with software comprising computer executable instructions operable to perform operations comprising:
   obtaining a first network coverage map of a first network and a second network coverage map of a second network, wherein the first network and the second network are configured to provide network connectivity to a mobile device;
   obtaining a road map for a geographical area;
   generating a combined map by combining the first network coverage map with the road map;
   tracking the mobile device along a path over which the mobile device travels while the mobile device is connected to the first network;
   generating a network switching map specific to the mobile device based on determining, using the combined map, at least one dead zone along the path of the mobile device, wherein the at least one dead zone is an area encountered along the path that is not serviced by the first network and is serviced by the second network;
   determining based on the network switching map that a predicted future location along the path of the mobile device is within the at least one dead zone; and
   causing the mobile device to switch from the first network to the second network based on the mobile device reaching the predicted future location and the network switching map.

17. The one or more non-transitory computer readable storage media of 16, wherein causing the mobile device to switch from the first network to the second network based on the mobile device reaching the predicted future location includes communicating with the mobile device, via the first network, to provision the mobile device to attach to the second network.

18. The one or more non-transitory computer readable storage media of 16, wherein obtaining the first network coverage map of the first network and the second network coverage map of the second network includes:
   obtaining, from a first mobile network operator, the first network coverage map of the first network including information about at least one of one or more cell coverage areas of the first network, one or more dead zones of the first network, or one or more quality of service (QoS) parameters in the one or more cell coverage areas of the first network, and obtaining, from a second mobile network operator different from the first mobile network operator, the second network coverage map of the second network including information about at least one of one or more cell coverage areas of the second network, one or more dead zones of the second network, or one or more QoS parameters in the one or more cell coverage areas of the second network.

19. The one or more non-transitory computer readable storage media of 16, wherein each of the first network and the second network is one of a fifth generation cellular network, a fourth generation cellular network, a long term evolution (LTE) cellular network, or a private radio network including one of a wireless local network, an LTE private radio network, and citizens broadband radio service network.

20. The one or more non-transitory computer readable storage media of 16, wherein determining that the predicted future location along the path of the mobile device is not serviced by the first network includes:

combining the path with the first network coverage map and the second network coverage map, and identifying the at least one dead zone of the first network along the path based on the path being combined with the first network coverage map and the second network coverage map, wherein the at least one dead zone encompasses the predicted future location.

* * * * *